United States Patent [19]

Niskin et al.

[11] Patent Number: 4,690,380

[45] Date of Patent: Sep. 1, 1987

[54] SHEAVE ASSEMBLY WITH MULTIPLE PULLEYS USED TO MEASURE CABLE ANGLE

[75] Inventors: Shale J. Niskin, Miami Beach; Gerald J. Williams, Dade County, both of Fla.

[73] Assignee: General Oceanics, Inc., Miami, Fla.

[21] Appl. No.: 824,243

[22] Filed: Jan. 30, 1986

[51] Int. Cl.⁴ .......................... B66D 3/06; G01L 5/08
[52] U.S. Cl. ...................................... 254/394; 33/1 N; 73/862.45; 254/403; 254/415
[58] Field of Search ............... 254/394, 398, 409, 411, 254/412, 413, 415, 416, 392, 335, 336, 284, 285, 273; 340/677; 33/1 LE, 1 N, 1 PT, 134 A, 534; 73/862.45

[56] References Cited

U.S. PATENT DOCUMENTS

| | | | |
|---|---|---|---|
| 2,121,870 | 6/1938 | Greene | 73/862.45 X |
| 2,743,606 | 5/1956 | Webber | 73/862.45 |
| 3,310,981 | 3/1967 | Nixon et al. | 73/862.45 |
| 3,343,810 | 9/1967 | Parnell | 254/273 |
| 4,034,963 | 7/1977 | Warman et al. | 254/336 X |
| 4,301,995 | 11/1981 | Niskin | 254/411 |
| 4,417,718 | 11/1983 | Niskin | 254/394 |
| 4,462,570 | 7/1984 | Gagnet | 254/268 |
| 4,492,363 | 1/1985 | Niskin | 254/394 |

FOREIGN PATENT DOCUMENTS

| | | | |
|---|---|---|---|
| 226991 | 5/1943 | Switzerland | 254/393 |
| 564287 | 9/1944 | United Kingdom . | |

OTHER PUBLICATIONS

*The General Oceanics Hydroblock System Notes on Tension Measurement* by General Oceanics, Inc. pub. May 1982.

Primary Examiner—Stuart S. Levy
Assistant Examiner—Joseph J. Hail, III
Attorney, Agent, or Firm—William A. Newton

[57] ABSTRACT

Disclosed is a counter-balanced sheave assembly for supporting a cable comprising a plurality of sheaves mounted in an arcuate path on a support frame; counter-balancing weights positioned above the support frame and rigidly connected thereto; and a suspension arrangement, connected at the center of the assembly, for providing rotation of the assembly about two perpendicular axes of rotation; and sensors are provided for determining downward force on the sheave assembly and the angle of the cable by monitoring the number of pulleys rotating.

8 Claims, 8 Drawing Figures

PROCESSOR AND DISPLAY UNIT

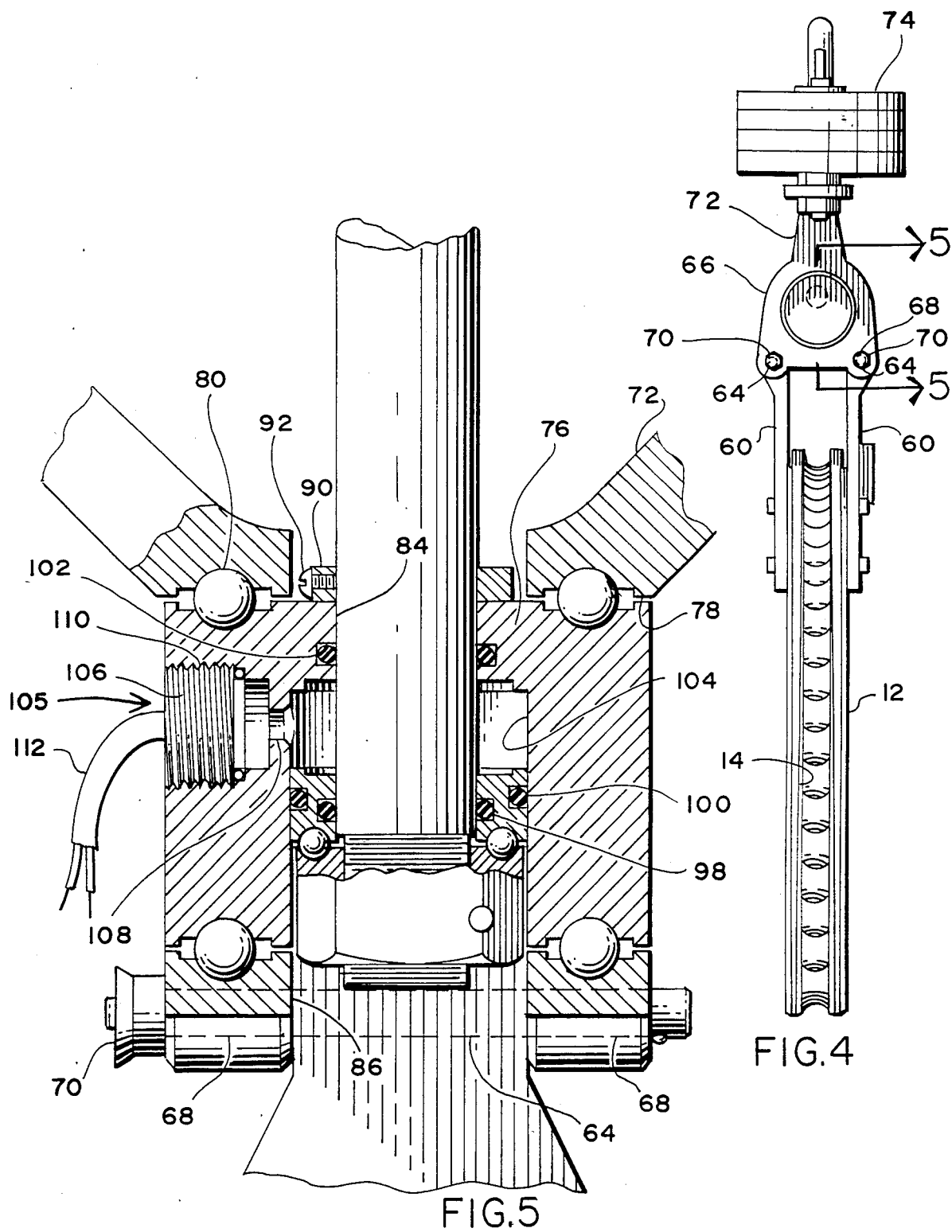

SHEAVE ASSEMBLY WITH MULTIPLE PULLEYS USED TO MEASURE CABLE ANGLE

BACKGROUND OF THE INVENTION

1. Field of the Invention

This invention relates to means of determining the load on a cable supported by a freely suspended multiple sheave assembly.

2. Description of Prior Art

For such activities as lowering wire cables to which sensors and instruments are attached, as in hydrographic work from ships, a freely suspended sheave is employed.

U.S. Pat. No. 4,492,363 discloses a sheave assembly having five pulleys and a pair of retainer pulleys positioned immediately adjacent the cable on either side of a center pulley so as to maintain the cable with a constant bend around the center pulley, regardless of the angle between the two ends of the cable extending from the sheave assembly. By virtue of this arrangement a line monitor is operatively coupled to the center pulley for measuring the tension, speed and footage of the cable. More specifically, magnets adjacent to the center pulley are used in the measurement of line footage and speed by measuring the speed and direction of the rotation of the center pulley and a strain gauge, located under the suspension eye-bolt, is used in the measurement of line tension. With a known constant bend of the cable around the center pulley, the measurements of the strain gauge can be directly translated into line tension.

As shown in the brochure entitled *Counterbalanced Block/Wire Metering Systems,* manufactured by General Oceanics, in another commercially available arrangement, a single pulley is used with a lever-like cable-following arm. As the angle of the cable (as defined by the two straight cable portions extending downward from the pulley) increases the arm is moved upward. A sensor (such as a hub-mounted potentiometer having a resistance that varies as a function of the angle of the arm) measures the angle of the cable. Additionally, a strain gauge, located under the suspension eye-bolt, is operatively coupled to measure the downward force of the cable on the pulley. From the downward force measured by the strain gauge and the angle of the line measured by the line follower, the load and therefore tension on the cable can then be calculated. In the prior art, this is typically done by digitizing the analog signals from the two sensors and computing therefrom the load. Such commercially available devices are shown in the previously mentioned brochure.

This load information is used to keep the cable tension within a specified range by controlling a winch to which one end of the cable is operatively coupled. In this manner, the cable is kept from being too tight or too loose.

INCORPORATION BY REFERENCE

U.S. Pats. Nos. 4,492,363; 4,301,995; and 4,417,718 are incorporated herein.

SUMMARY OF THE INVENTION

The present invention is directed toward sheave assembly having a plurality of sheaves mounted in an arcuate path; wherein the improvement comprises providing a plurality of sensors disposed to detect rotation of a plurality of the sheaves. The angle of the cable, as defined by its end portions extending downward from the sheave assembly, can be determined in numerous ways from sensing rotation of the sheaves distributed over the arcuate path. For example, when at least one sheave is rotating the angle has been found to be a function of the number of sheaves rotating; the number of sheaves not rotating; or the furthest out rotating sheave with respect to the center of the sheave assembly.

Although some applications may require sensors to be operatively disposed adjacent to sheaves on only one half of the sheave assembly, it has been discovered that if sensors are placed on both halves of the sheave assembly, then a correct determination of the cable angel can be made even under light load conditions, where the weight of the assembly itself causes the assembly to tilt downward which in turn causes cable to depart from the assembly at different angles, so that different numbers of sheaves are rotating each of the halves of the assembly. By determining the total number of sheaves rotating, it has been found that the angle can be accurately determined in this situation, where cable-following arm arrangement of the prior art would provide inaccurate results, due to measuring just one of the unequal angles of the cable.

Additionally, the sheave assembly of the present invention uses a novel way to measure the downward force on the sheave, such measurement being used in combination with cable angle to determine the tension or load on the cable. Instead of the sometimes unreliable strain gauge of the prior art, applicant has filled a chamber containing a slidably positioned suspension means for supporting the assembly with a liquid. A hydraulic gauge is fluidly coupled to the chamber to measure the pressure of liquid, such pressure being a function of the downward force.

BRIEF DESCRIPTION OF THE DRAWINGS

Further objects and advantages of the present invention will become apparent as the following description proceeds, taken in conjunction with the accompanying drawings in which:

FIG. 4 is a side view of the sheave assembly.

FIG. 5 is a fragmented, cross sectional view of the suspension means, taken along section line 5—5.

DESCRIPTION OF THE PREFERRED EMBODIMENT

As shown in the FIGURES, there is disclosed a counter-balanced sheave assembly 10 constructed in accordance with the present invention. The assembly 10 includes an arched support frame 12 defining an upwardly facing trough 14 with a U-shaped cross-sectional configuration.

Figures 1, 2, 3:
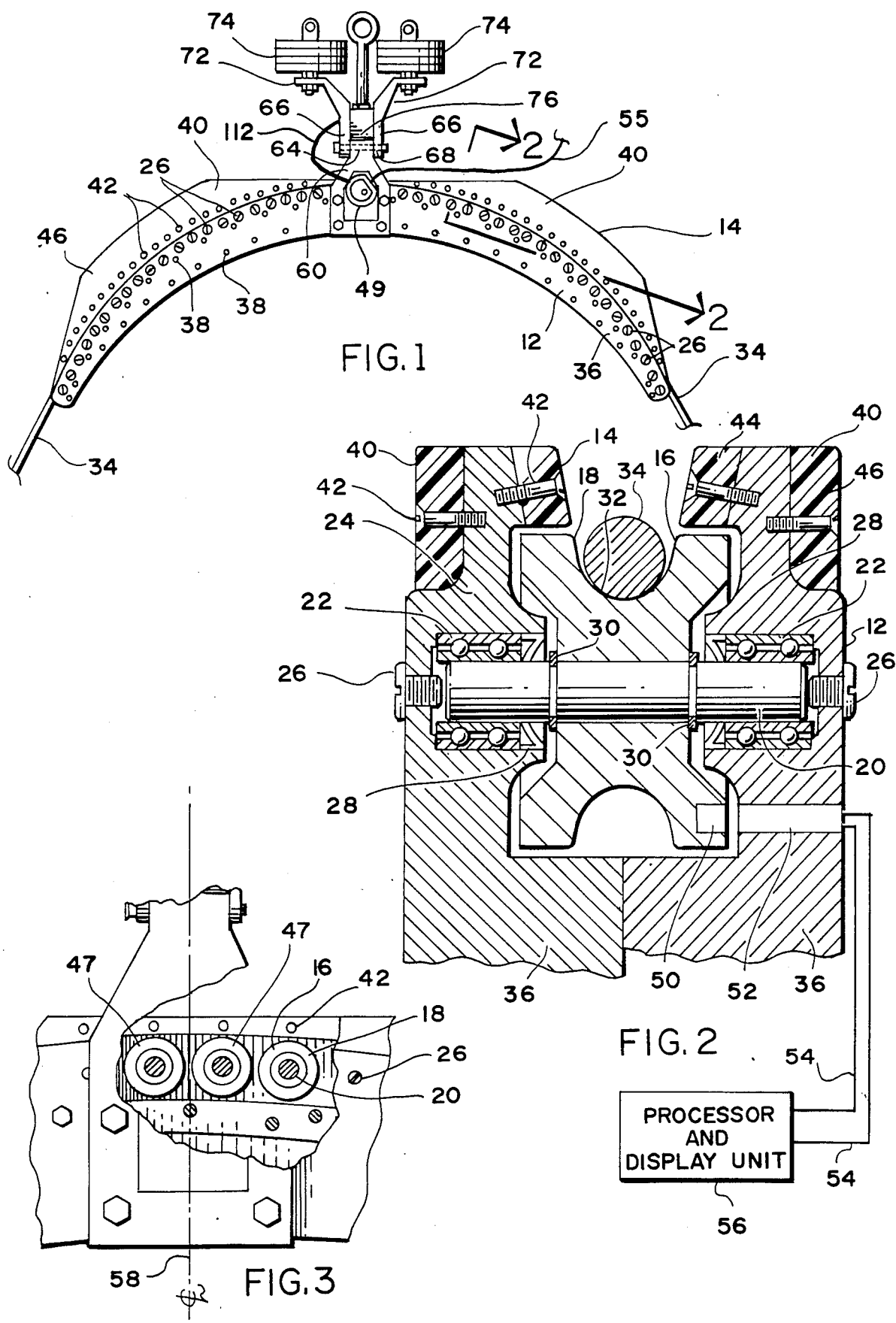
FIG. 1 is a side view of the sheave assembly of the present invention.
FIG. 2 is a fragmented, cross-sectional view of the support frame taken along section line 2—2.
FIG. 3 is a fragmented, break away view of the center of the sheave assembly.

As shown in FIG. 2, mounted inside the trough 14 is a plurality of sheaves or pulleys 16. Each sheave 16 comprises a steel ring 18 rotatably mounted by having an axle 20 engage a ball bearing race 22. Each axle 20 traverses the opposed sidewalls 24 of the trough 14 and has its opposed ends extending into sidewalls 24, so as to be secured by a pair of screws 26 on either side of the trough. The ball bearing race 22 provides relatively frictionless rotational movement. On both sides of the steel ring 18 there is positioned around the axle 20 a pair of oil seals 28 and a pair of retaining rings 30. Each of the sheaves 16 are provided with an integrally formed, open groove 32 to receive a line, rope, cable or like cable element, hereinafter referred to as cable 34. Typically, the support frame 12 is formed by two mirror image half portions 36. These half portions 36 are secured together by nut and bolts 38 and their upper portions define the sidewalls 24.

As shown in the figures, the sheaves 16 are aligned in a downwardly arcuate path or curve along the curved length of the trough 14, which generally, but not necessarily, conforms somewhat to the center of the trough 14. Preferably, although not necessarily, the arcuate path for alignment of the sheaves 16 has an increasing rate of curvature as the path extends outward and downward from its center. By virtue of this configuration, stress on the strands of the cables is equalized over the sheaves. The cable 34 is positioned over the sheaves 16, so as to fit in each of the grooves 32. The sidewalls 24 of the frame 12 extend upward above the sheaves 16 so as to provide a guide for inserting the cable 34 and for maintaining the cable in place. A pair of cable guards 40 are mounted to the opposed sidewalls 24 by flat head screws 42 to help keep the cable 34 within the trough 14. Each cable guard is formed by an inside wing 44 and an outside wing 46.

The support frame 12 contains, for example, 46 sheaves 16 and defines an illustrative arc of 135 degrees. This arc is only illustrative and is one that is particularly suitable for cable having fiber optic filaments therein. There is provided a sufficient number of sheaves to accomplish the objectives of the invention, which will be described in detail hereinafter.

As shown in FIG. 2, operationily positioned with each sheave 16 is a commercially available pulley-rotation sensor assembly 48 which is used to detect rotation of the sheave. As in the previously described prior art arrangement, one of the sensors 48 issued to determine cable payout and total length in/out and preferably, but not necessarily, is used with one of the two center sheaves 47 shown in FIG. 5. The known cable-counter electronics is contained within the hub assembly 49 and is not part of this invention. The sensors 48 are placed on a plurality of the sheaves 16. Other than one used to provide the above described information, the remaining sensors are used to detect sheave rotation only. The sensor assembly 48 comprises a permanent magnet 50 embedded in the steel ring 18 and a magnetic switch 52 comprising a commercially available solid state hall effect magnetic sensor. As described in more detail hereinafter, the digital signals from the switch 52 are fed back via electric lines 54 (lines only partially shown) to the hub assembly 49 and then the lines 54 are included in a cable 55 which goes to a processor and display unit 56. Each rotation of the sheaves 16, whether it is the center sheave or otherwise, provides an electrical pulse to the unit 56 for processing. In general, the number of sheaves 16 in which rotation is detected is correlated with the angle defined by the two ends of the cable 34. The smaller the angle, the greater the number of sheaves 16 that will be engaged by the cable 34. Although the illustrative sheave assembly 10 is designed to be used with a maximum angle of 135 degrees, the angular range formed by the cable 34 can vary in many applications from a range of approximately 0 degrees to almost 180 degrees. The number and position of sheaves 16 having sensors 48 is a matter of design choice. Preferably, as shown in the preferred embodiment, a sensor assembly 48 is used with each sheave 16.

In the preferred implementation, as will be described in detail hereinafter, the number of pulleys which are rotating is used to determine the angle defined by the two ends of the cable 34 which extend outward from the assembly 10. However, it shoud be noted that other implementations fall within the scope of the invention, such as detecting the last sheave 16 on the periphery which is rotating, since this too is a function of the angle of the cable 34. In general, the greater the angle formed by the cable 34, the fewer sheaves 16 that will be rotating and the nearer the ones that are rotating will be to the center line 56 as shown in FIG. 1 and the two center sheaves 47. Detection of one or both of these characteristics that vary with the cable angle can provide information used to estimate the angle. Of course, the number of non-rotating sheaves 16 could be measured in place of the number of rotating sheaves 16.

The greater the number of sheaves 16, the more precise the determination of the cable angle, The choice of the number of sheaves with sensors 48 is a matter of design preference, typically requiring the weighing of the cost against accuracy needed in determining the angle and the number of sheaves needed for creating a sufficiently light multi-pulley arrangement to substitute for a single pulley assembly for a given contemplated use. For the fiber optic cable operation for which the 135 degree maximum angled sheave assembly 10 was designed, forty-six sheaves 16 were found desireable.

During very light loads, when the tension on the cable 34 is insufficient to counteract the downward weight of the sheave assembly 10, the angles formed by the cable 34 with respect to the ends of the sheave assembly 10 are unequal. In other words, a line bisecting the cable angle will not bisect the arcuate path of the support frame 12. It has been found that even despite these unequal angles, the number of pulleys rotaing provides a very good estimate of the angle needed for the tension calculation. However, for those applications where light loads do not exist or light load conditions can be ignored, the sensors can be mounted on only one side of the center line 58. In heavy load conditions, the number of sheaves 16 rotating on each side of the center line 58 are essentially equal, and information from either half is sufficient for determining the desired angle.

It should also be apparent to those skilled in the art that, depending upon the applications for which the sheave assembly is designed, it may be unnecessary to have sensors 48 on those sheaves 16 disposed toward the center line 58, if it is contemplated that angles will never become so large as to place them in a non-rotating condition when the cable is moving.

As will be briefly described and as shown in incorporated U.S. Pats. Nos. 4,417,718; 4,492,363; and 4,301,955 in FIGS. 1 and 4, a pair of opposed mounting arms 60 are formed attached by nuts and bolts 62 to the sidewalls 24 of the frame 12 at its center portion and extend upward therefrom. Each mounting arm 60 has a pair of bore holes 64 formed therein, such holes being disposed in equally spaced relationship from a plane which bisects the trough 14 and the sheaves 16. Connecting means are provided in the form of a pair of opposed side frames, each having a pair of bore holes 68 aligned with the bore holes 64. A pair of pins 70 pass through the holes 64 and 68 so as to rigidly couple the support frame 12 to the side frames 66. The connecting means further includes the side frames 66 having, respectively, a pair of upwardly extending rigidly connected weight support arms 72. Rigidly mounted on top of the weight support arms 72 are counter-balancing means in the form of a pair of weight members 74, respectively. Consequently, the weights 74, weight support arms 72, the side frames 66 and the support frame 12 are all rigidly secured together.

As shown in more detail in FIG. 1 (and also in the incorporated patents), suspension means are provided for allowing pivotal motion about two axis, which are perpendicular to each other. The suspension means includes a first rotatable member, in the form of a swivel shaft 76, which is pivotally mounted between the side frames 66. By virtue of this pivotal connection, the connecting means which includes the side frames 66; the counter balancing weight members 74; and the support frame 12 with the sheaves 16 mounted thereto, all rotate as a single unit about the pivotal axis of the swivel shaft 76. The swivel shaft 76 is rotatably mounted in a pair of circular apertures 78, one of the pair being formed in each of the side frames 66 between and slightly above the holes 68. A ball bearing race 80 is positioned between each of the side frames 66 and the swivel shaft 76 to provide relative frictionless rotational movement of the shaft 76 about its pivot axis.

The suspension means further includes a second rotatable member, in the form of eyebolt 82, which extends through an opening 84 formed in the swivel shaft 76 and terminates in a counter-bored portion 86, where a nut 88 secures the eyebolt 82 against removal therefrom, but permits the rotation thereof. The axis of rotation of the eyebolt 82 is substantially perpendicular to the pivot axis of the swivel shaft 76. A ring 90 and set pin 92 prevent the eyebolt 82 from extending out of the counter-bored portion 86. With light loads, the pivot axis of the eyebolt 82 will be at an angle with respect to the plane containing the arcuate path and the cable. A ball bearing race 94 is provided in a pressure disc, along with three O-rings 98, 100 and 102. An enlarged cavity 104 is defined in surrounding relationship to the eyebolt 82 above the pressure disc 96.

In the prior art arrangements shown in the incorporated patents a strain-gauge load cell was positioned in the cavity 104. A novel load cell 105 of the present invention has the cavity filled with hydraulic fluid, such as oil, unlike the prior art as shown in FIG. 5. Also, a hydraulic transducer 106 is fluidly coupled to the cavity 104 to measure the fluid pressure of the oil cavity 104. More specifically, a tubular hole 108 is disposed between the cavity 104 and a circular chamber 110 having a threaded inner surface containing therein the hydraulic transducer 106 which has a threaded cylindrical exterior. An electrical cable 112 extends from the transducer 106 to the central hub 49 whereat the electrical wires from the transducer 106 continue to the processor unit 56 via electrical cable 55. One suitable transducer 106 is Model AB Pressure Transducer, sold by Data Instruments, Inc. of Lexington, Ma.

In operation, as the load on the sheave assembly increases, the liquid in the cavity is further compressed and increases the pressure therein as the nut 88 moves upward in the counter-bored portion 86. The transducer measures this pressure, which in turn is a function of the force which is downward from the center axis of the eyebolt 82 and a line that bisects the arcuate path of the sheaves 16. The transducer measures the downward force in the direction of the pivotal axis and center line of the eyebolt 82.

As with the designs of the incorporated patents in normal use of the sheave assembly 10, it is suspended by the eyebolt 82 so that the cable 34, being payed over the plurality of sheaves 16, is above ground or platform level and extends downwardly from either end of the elevated frame 12. The frame 12 can swing in a horizontal plane about the axis of rotation of the eyebolt 82 and in a vertical plane about the axis of rotation of the swivel shaft 76; thereby automatically maintaining at all times the cable 34 in the plane of the arcuate path. As a result, the cable will be lying evenly in the groove 32 of each sheave 16.

The principles used by the unit 56 to calculate the wire tension of the cable 34 will be described hereafter. The cable 34 defines between the two segments of the cable an angle 2A. Each segment of the cable 34 has a tension T. When the weight of the sheave assembly itself is not a factor (small compared to the tension and load forces), then the angle of each cable segment relative to a center axis passing through the eyebolt 82 is angle A, i.e. the center axis bisects the angle 2A.

In use, the sheave assemby 10 is suspended freely at the eyebolt 82 and would in the absence of the cable, hang vetically from that point. The load cell 105 measures the load L in the direction of the center axis of the eyebolt 82. Since the assembly is in equilibrium, the component of tension T, in the two cable segments, in the direction of the center axis is equal the load on the assembly 10 measured by the load cell 105, i.e.:

$$L = 2T \cdot \cos A$$

or $$T = L \cdot \tfrac{1}{2} \sec A$$

As previously explained, the number of rotating pulleys 16 is a function of 2A, even if the weight of the sheave assembly is not small and is a factor so as to prevent the center axis from bisecting the angle 2A. As can be seen, it is necessary to determine angle A to find an accurate value of tension T.

As previously explained, as the cable angle 2A increases or decreases, the load measured by load cell 105 decreases or increases respectfully. For example, the sheave assembly 10 is particularily suitable for being used as an overboarding block to guide the cable over the stern of a cable-laying ship. During towing operations, the cable angle increases and the load decreases. The drop in the load cell 105 signal is compensated using an accurately determined angle A so that a constant value of the cable tension would be displayed by the unit 56.

Figure 6:
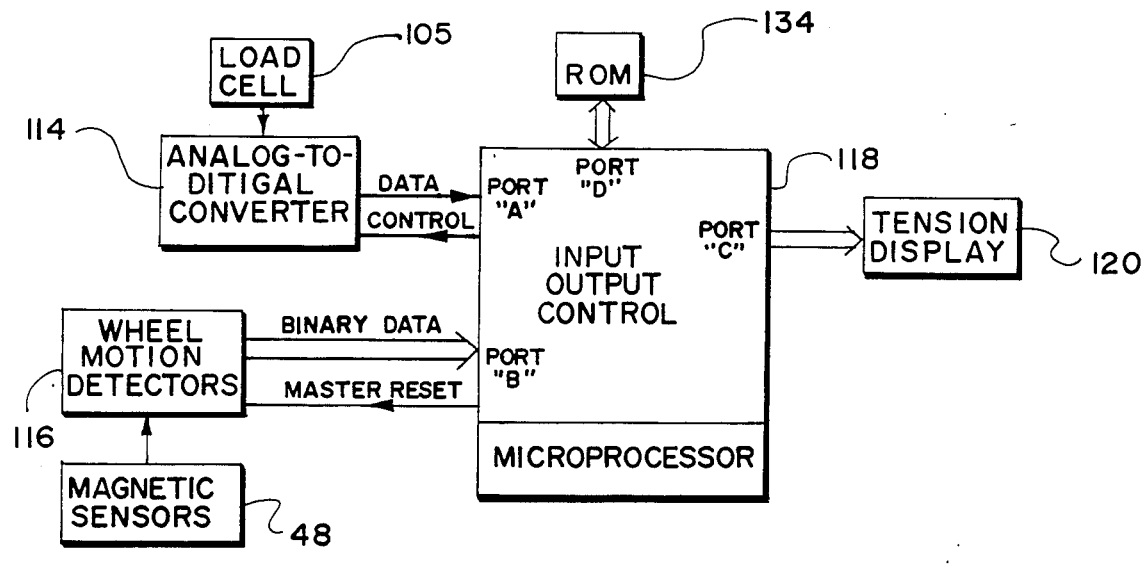
FIG. 6 is a block diagram of the processor and display unit of the present invention.

Referring to FIG. 6, there is shown a general schematic diagram of the unit 56. The processor and display unit 56 includes an analog to digital converter 114 that digitizes the signal from the load cell 105. The digital signals from the magnetic hall effect sensors 48 are provided to a wheel motion detector 116. The unit 56 includes commercially available microprocessor unit 118 and display unit 120. The microprocessor unit 118 is defined to have a conventional input-output control having ports A, B, C whereby data is provided from the converter 114 and the detector 116 to the microprocessor and data for display is provided to unit 120. Likewise, as will be described in more detail hereafter, control from the programed controlled microprocessor 118 is provided to the converter 114 and detectors 116. The hardware of units 118 and 120 is well known to those skilled in the art and will not be described in detail hereinafter.

Figure 7:
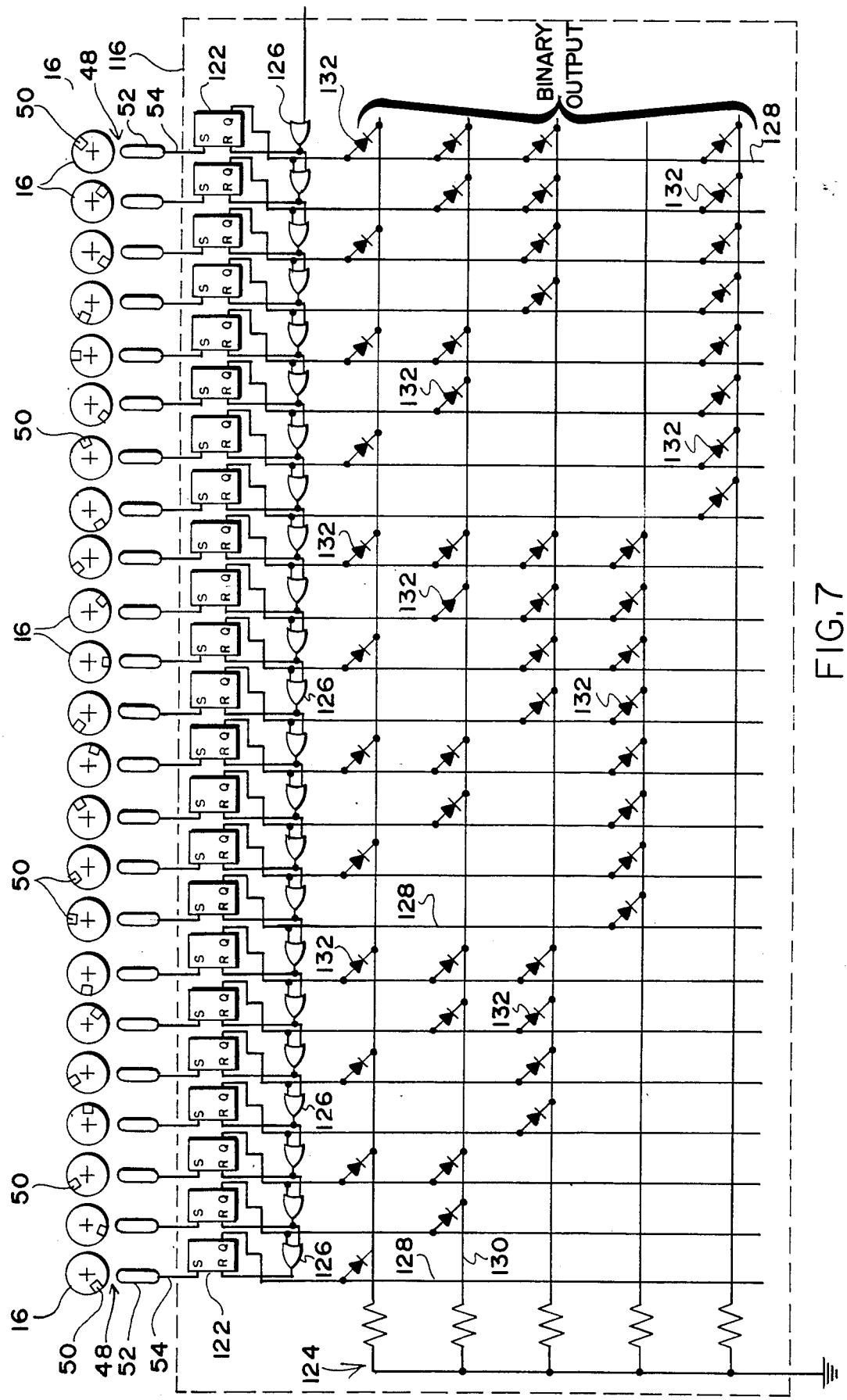
FIG. 7 is a schematic diagram of the wheel motion detectors.

Referring to FIG. 7, a detailed circuitry diagram illustrates one suitable implementation of the wheel motion detector 116. The pulleys (rollers) 16 and sensors 48 are schematically shown coupled to the wheel motion detector 116 by the electrical wires 54. Both the converter 114 and detector 116 are part of unit 56 and are (although not necessarily) housed in a housing for unit 56 which is separated from the assembly 10 and which is interconnected by the cable 55. The cable 55 includes the electrical wires 108 for the transducer 106 and the wires 54 for the detectors 116. Typically, there would be 1 power wire, 1 ground, and 46 signal wires (one for each detector 116) for the detectors 116. It is contemplated that for some applications, it would be desirable to place the detector 116 in the hub 49 so as to reduce the number of wires on cable 55.

Generally, the circuitry of detector 116 detects the motion of any rollers 16 during a sample interval, for example 1 to 10 seconds. The detector 116 output is a binary number provided to port B of the microprocessor unit 118 (shown in FIG. 6) representing the highest numbered role 16 that moved during the sampling interval. Althouh numerous arrangements are possible, the illustrated detector 116 shows one of two sets of 23 sensors 48 used in the illustrated implementation. One of these two sets of 23 sensors are placed on each side of the assembly 10, with the lowest numbered pulley being closest to the center of the sheave assembly 10.

Operation of each of the two sets of 23 pulleys 16 is as follows. As the magnet in the pulley 16 passes the Hall-effect sensor 48 a momentary pulse representing a logic "1" is applied to the "S" input of a corresponding flip-flop 122. This sets the "Q" output of the flip-flop 122 to a logic "1". Also, this indicates that the pulley 16 has turned through at least part of a revolution. A logic "1" applied to the "R" input or the flip-flop 122 resets the "Q" output back to logic "0". This happens when either a "master reset" is applied by the microprocessor unit 118 or when a higher numbered flip-flop 122 is set. A diode matrix 124 converts the "1 of 23" coding of the flip-flops 122 into a binary coded output number. The diode matrix is a well known structure. Each pulley 16 is assiganed a five-bit binary number which gets progressively larger as the pulleys extend outward from the center. A plurality of OR gates 126 are coupled between the flip-flops 122 and the matrix 124. The diode matrix, which can be easily reduced or extended for lesser or greater numbers of pulleys 16, has twenty-three wires 128 and five wires 130 (one of the five wires for each bit of a five bit binary output). For each binary 1 in the binary number of each pulley 16, a diode 132 is electrically coupled from the wire 128 from that pulley 16 to one of the wires 130 which represents the same bit position in the five bit binary output as the bit position of the 1 in the binary number representing the pulley. This pattern is followed for each pulley 16.

In operation, the controlling microprocessor unit 118 applies a "master reset" to the detector 116. Then after waiting for a predetermined sampling interval, the microprocessor unit 118 accepts the 5 bit binary output as shown in FIGS. 6 and 7 from each of the two sets. There is a minimum speed of rotation of the pulleys 16 below which the detector 116 works erratically. The greater the number of magnets in each wheel (only 1 shown in illustrated embodiment) and the longer the sampling interval the lower this minimum speed becomes.

As can be seen, the microprocessor unit 118 in a conventional and well known manner provides control for the converter 114 and detector 116. Generally, the unit 118 provides the signal to start the conversion for the converter 114 in a conventional manner.

Figure 8:
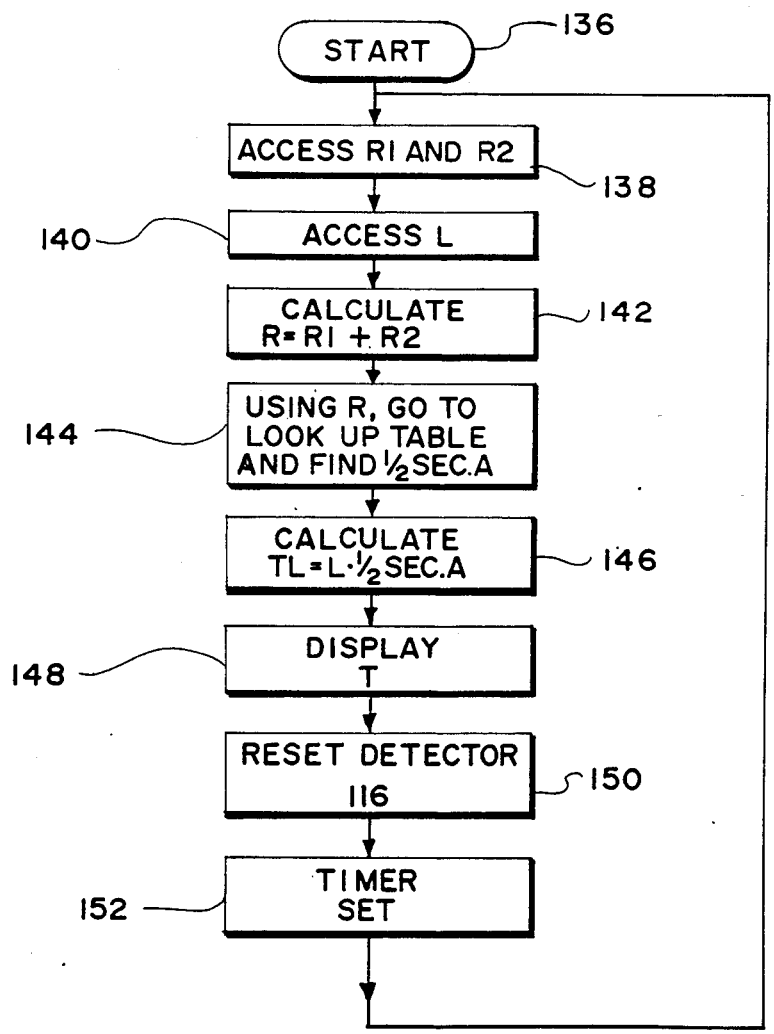
FIG. 8 is a flow diagram of the stored program for the processor and display unit.

Referring to FIGS. 6 and 8, the program controlling the processor 118 is stored in ROM memory 134. A flow chart of the steps of the program is shown in FIG. 8. The program starts at step 136 and accesses at step 138 from the detector 116 two five bit binary numbers R1 and R2 from the detector 116, each representing the highest numbered wheel that moved during that interval. Next, at step 140 the program accesses the digitized load L from the converter 114. At step 142, the program then adds the two binary numbers R1 and R2 to determine R, the total number of pulleys 16 in motion. As previously described, any asymetry of the cable relative to the assembly 10 would then be corrected. It is assumed that all pulleys in a given set with lower numbers than the highest number pulley detected rotating, also are rotating. At step 144, the program uses the value of R to access a look-up table in ROM memory 134 to provide a value of ½Sec A, as previously described. In other words, a look-up table is used to correlate the number of rollers having motion to the angle A of the cable. This correlation is illustrated in table I below:

TABLE I

| Deflection angle (A) in Degrees | Number of Pulleys Covered (R) |
|---|---|
| 81 | 6 |
| 78 | 8 |
| 75 | 10 |
| 72 | 12 |
| 69 | 14 |
| 66 | 16 |
| 63 | 18 |
| 60 | 20 |
| 57 | 22 |
| 54 | 24 |
| 51 | 26 |
| 48 | 28 |
| 45 | 30 |
| 42 | 32 |
| 39 | 34 |
| 36 | 36 |
| 33 | 38 |
| 30 | 40 |

At step 146, the tension of the cable 34 is calculated as follows:

$$T = L \cdot \tfrac{1}{2} \operatorname{Sec} A$$

At step 148, the value of T is displayed using the display 120 of FIG. 6. Next, at step 150, as previously described, the processor sends the "master reset" to the detector 116. At step 152, the program sets a timer to assure that at least 1 to 10 seconds (as desired) has past prior to accessing a new set of roller values from the detector 116. After this, the loop is repeated.

The calculated value for the cable tension T from the unit 56 can be used in conventional ways as will be described hereinafter. The use of T and the means for using the same are well known and are per se not part of the invention. Typically, the sheave assembly 10 of the present invention is used in a closed loop control system which controls cable tension during cable-laying operations. The complete system comprises the sheave assembly 10 of the present invention to guide the cable over the stern of the cable-laying ship, the processor and display unit 56 for calculating a cable tension, a tension controller and a hydraulically controlled winch. As described, using the present invention the tension in the cable is determined. Using this tension value, the tension controller adjusts the current in an actuating coil of a proportional hydraulic valve. This in turn adjusts the braking applied to the winch so as to maintain tension within preset limits. The tension controller and hydraulically controlled winch are per se not part of the present invention and will not be described in any detail hereinafter. The calculated value of the tension T normally will be viewed on the display 120 by an operator and manually inputted to the tension controller. However, the tension T could be automatically fed to the tension controller.

Although the novel load cell 105 is shown with the preferred embodiment, it should be understood that a strain gauge type load cell as shown in the incorporated patents can be used with the novel angle detecting arrangement of the present invention. There are a variety of commercially available Hall effect sensors that can be used for sensor 48. One suitable one is 9SS LO-HET/1035 R manufactured by MicroSwitch, a Honeywell division.

Although particular embodiments of the invention have been shown and described here, there is no intention to thereby limit the invention to the details of such embodiments. On the contrary, the intention is to cover all modificaitons, alternatives, embodiments, usages and equivalents of the subject invention as fall within the spirit and scope of the invention, specification and the appended claims.

What is claimed is:

1. In a counter-balanced sheave assembly for supporting a cable having a tension applied thereto and which extends downward from said sheave assembly so as to define a cable angle, said sheave assembly having a support frame; a plurality of sheaves rotatably mounted to said support frame along a downwardly facing, arcuate path the improvement comprising:

means for measuring downward force on said sheave assembly and for generating a force signal indicative of said downward force;

a plurality of sensors, each one disposed to detect rotation of one of said sheaves and for generating rotation signals indicative of said rotation for each said sheave for which rotation is sensed;

means for determining said angle of said cable from said rotation signals and for generating an angle signal indicative of said angle; and means for determining said tension applied to said cable from said force signal and said angle signal.

2. The sheave assembly of claim 1, wherein angle determining means comprises means for determining the number of sheaves experiencing rotation; whereby a greater number of rotating said sheaves indicates a smaller said angle and a greater number of non-rotation said sheaves indicates a greater said angle.

3. The sheave assembly of claim 1, wherein said sensors are operatively disposed to sense rotation on at least substantially all of said sheaves on one half of said sheave assembly.

4. The sheave assembly of claim 1, wherein said sensors are operatively diposed to sense rotation on substantially all of said sheaves; whereby determining said angle is made relatively insensitive to light load conditions.

5. The sheave assembly of claim 1, wherein said sheave assembly further comprises suspension means for supporting said support frame, said suspension means having a first member and a second member, said second member including an elongated portion and an enlarged end portion integrally attached to said elongated portion, said first member being attached to said support frame and including an enlarged cavity and a restricted aperture opening into said cavity, said second member being disposed with said elongated portion extending through said aperture and with said enlarged portion within said enlarged cavity, said cavity and said enlarged end defining a chamber filled with liquid, said downward force measuring means including said chamber and a hydrualic transducer for measuring the pressure of said liquid, said downward force measuring means being operative to measure the force in direction of the center axis of said elongated portion.

6. The sheave assembly of claim 5 wherein said first member has said pivot axis and is rotatably mounted; and said second member is pivotally secured to said first member with its rotation axis being substantially perpendicular to said pivot axis of said first member, said second member being operable for supporting said sheave assembly.

7. The sheave assembly of claim 5, wherein said second member is an eyebolt with a nut secured at one end.

8. The sheave assembly of claim 7, further including counter-balancing means positioned above said support frame; connecting means disposed between said counter-balancing means and said support frame for rigidly interconnecting the same; said suspension means pivotally connected to said connecting means by said first member and having the pivotal axis of said second member being substantially parallel to said a plane containing arcuate path.

* * * * *